Oct. 5, 1926.
V. H. VAN SANT ET AL
1,602,057
STEERING DEVICE
Filed March 7, 1924     3 Sheets-Sheet 1
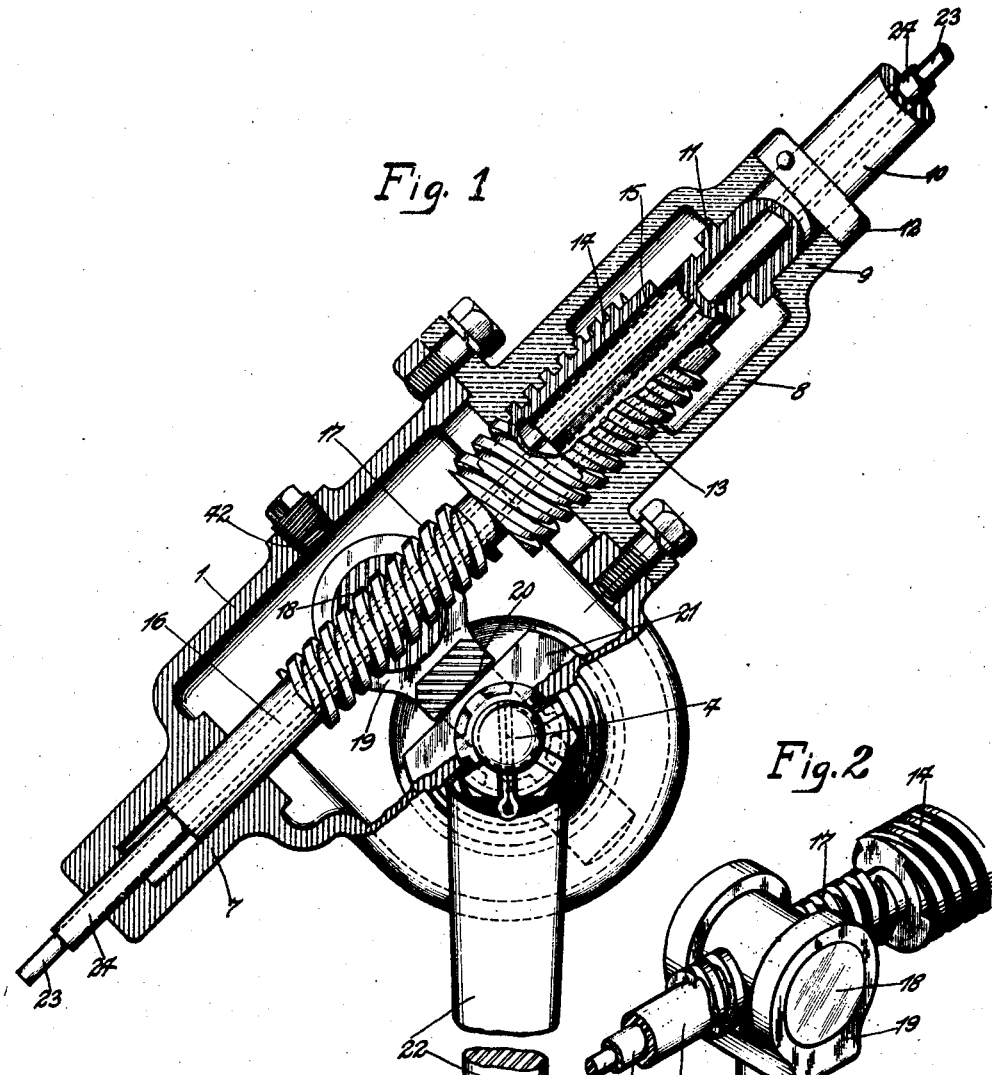
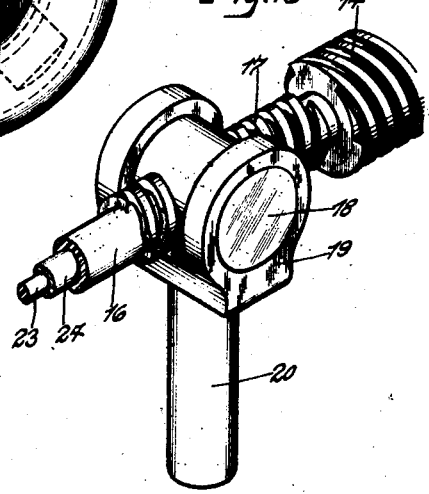
INVENTORS.
Victor H. Van Sant,
Thomas G. Van Sant,
THEIR ATTORNEYS.

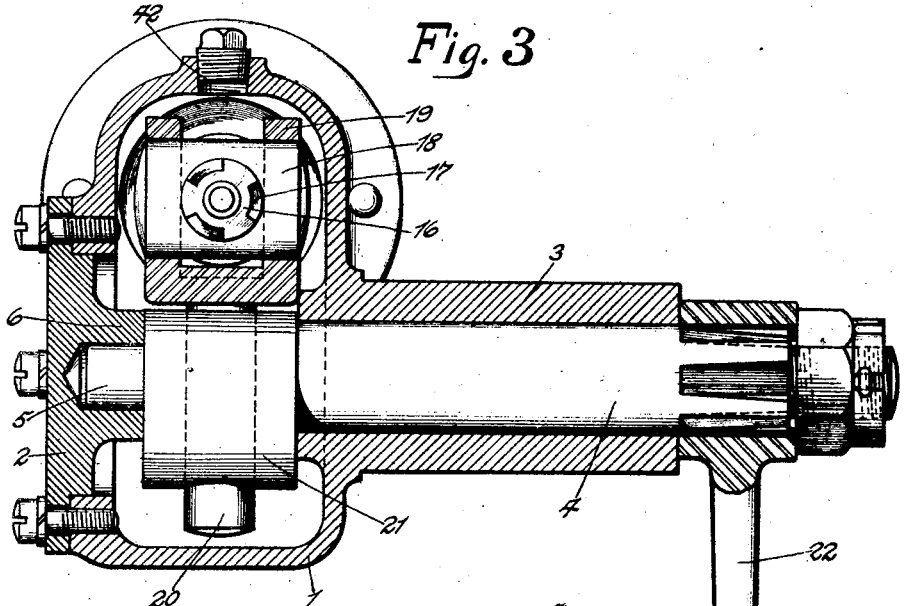
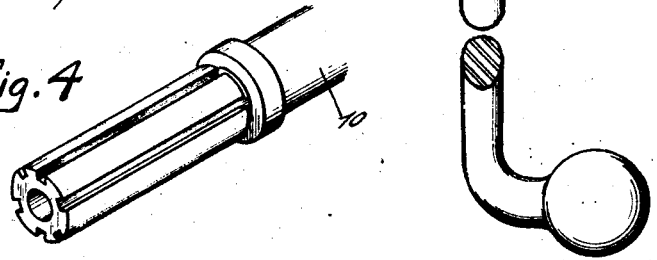

Patented Oct. 5, 1926.

1,602,057

UNITED STATES PATENT OFFICE.

VICTOR H. VAN SANT, OF ST. LOUIS, AND THOMAS G. VAN SANT, OF POPLAR BLUFF, MISSOURI.

STEERING DEVICE.

Application filed March 7, 1924. Serial No. 697,563.

This invention relates to steering devices.

An object of the invention is to provide elements arranged in a novel cooperative relationship with the steering rod and the steering crank shaft of a motor vehicle for increasing the speed of rotation or extent of rotary movement of the crank shaft as compared with the speed of rotation and extent of rotary movement of the steering rod.

Another object of the invention is to provide mechanism associated with and controlled by the steering rod for imparting a quick and positive rotary movement to the steering crank shaft by comparatively slight rotation of the steering rod in either direction.

Another object of the invention is to provide an improved steering gear for motor vehicles comprising a threaded sleeve movable longitudinally along the steering rod, and a separate threaded shaft member operatively connected with said sleeve for relative longitudinal movement, and means connecting the separate threaded shaft member with the steering crank shaft for obtaining the desired operation of the steering crank shaft in a positive and facile manner.

Other objects will appear from the following description, reference being made to the drawings in which—

Fig. 1 is a sectional view illustrating one embodiment of the invention.

Fig. 2 is a perspective view showing portions of the two threaded elements and the connection of one of them with the device for operating the steering crank shaft.

Fig. 3 is a cross sectional view taken at right angles to the section of Fig. 1, illustrating other features of the connections for turning the steering crank shaft by one of the threaded members operated by the steering rod.

Fig. 4 is a perspective view of a portion of the steering rod that is connected with one of the threaded members.

Figure 5:
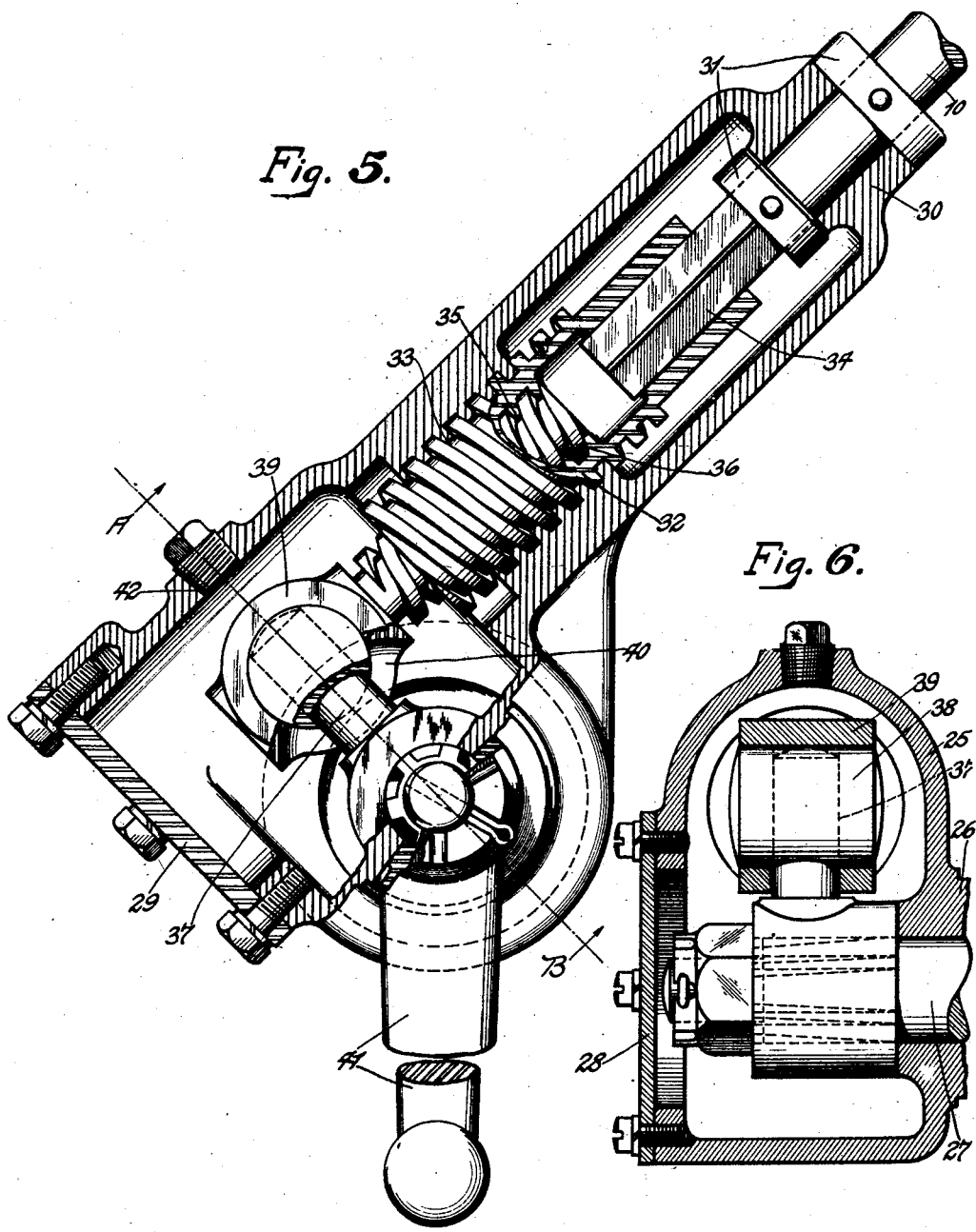
Fig. 5 is a sectional view similar to Fig. 1 showing an alternative form of the invention.

In the form of the invention shown in Figs. 1 to 4 inclusive the portion of the steering gear housing that supports the steering gear crank shaft comprises a part 1, the open side of which is closed by a plate 2 rigidly supported in connection with the part 1. The part 1 of the housing has a bearing extension 3 in which the steering gear crank shaft 4 is journaled for rocking movements, said shaft having an extension 5 of reduced diameter journaled in a bearing 6 in the plate 2. The lower end of the housing member 1 has a bearing 7 in which one of the threaded actuating elements of the steering gear extensions have longitudinal movements. The upper part of the housing includes a sleeve member 8 having a bearing 9 on its upper end in which a steering rod 10 is mounted for turning movements, the same being held from longitudinal movements by a circumferential flange 11 at the inner end of the bearing 9 and a collar 12 attached to the steering rod 10 at the outer end of the bearing 9. The sleeve 8 is rigidly and detachably secured to the housing part 1.

The lower end of the sleeve 8 has internal threads 13 receiving the corresponding right hand threads of a sleeve 14 splined for sliding movements upon the end of the steering rod 10. The splined connection 15 between the sleeve 14 and the steering rod 10 requires the sleeve to turn with the steering rod and the threaded engagement of the sleeve 14 with the threads 13 moves the sleeve 14 longitudinally as an incident to the turning of the steering rod.

An extended or connected part 16 at the lower end of the sleeve 14 has its lower end supported for longitudinal movements in the bearing 7 and is provided with left hand threads 17. An element 18 has a threaded hole therein through which the part 16 extends and with which the threads 17 engage. The element 18 is supported for rocking movements in a bifurcated head 19 on the end of a crank arm 20 extending at right angles to the axis of the shaft 4 through the enlargement 21 of said shaft. The crank arm 20 is capable of sliding movements through the enlargement 21 of the shaft 4 so that the operation of the mechanism is easy and free from serious frictional resistance.

The end of the steering crank shaft 4 is equipped with an adjustable steering arm 22 of the usual or any preferred form. The throttle valve operating connection 23 and spark lever operating connection 24 extend through the steering rod and through the threaded actuators and thence through the lower end of the bearing 7 to connection with the parts controlled thereby (not shown).

Figure 6:
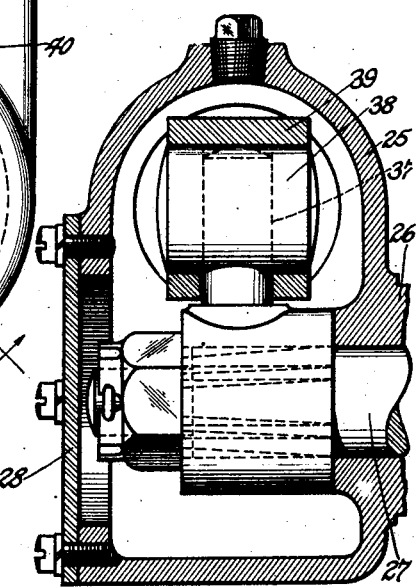
Fig. 6 is a sectional view at right angles to the section of Fig. 5 on the line A—B of Fig. 5.

In the form of the invention shown in Figs. 5 and 6 the steering gear housing comprises a housing part 25 having a lateral extension 26 in which the steering gear crank shaft 27 is journaled for rocking movements. The open side of the housing member 25 is closed by a plate 28, and the open lower end of the housing is closed by a removable end plate 29.

In this form of the invention the steering rod 10 is mounted for turning movements in a bearing 30 at the upper end of the housing and is held from longitudinal movements by rings 31 at opposite ends of the bearing 30. A sleeve 32 having right hand threads thereon is screwed into a threaded portion 33 of the housing and has an operative connection 34 with the end of the steering rod 10 whereby the sleeve 32 will be turned with the steering rod and as an incident to such turning movement will be moved longitudinally by the threaded connection with the housing 25. The inside of the sleeve 32 is provided with left hand threads 35 engaging the left hand threads of a separate actuating member 36. The inner end of the steering gear crank shaft 27 has a crank arm 37 attached thereto upon which a block 38 is mounted for sliding movements. The block 38 is also mounted for turning movements upon its horizontal axis in a head 39 rigid with the lower end of the threaded actuator 36. The head 39 has an appropriate slot 40 through which the crank arm 37 extends. By this construction and relationship of parts free relative movement of the various connected elements is permitted. A steering arm 41 of usual or selected form is adjustably connected with the steering gear crank shaft 27.

By this form of the invention the longitudinal movement of the actuating member 36 in either direction is twice the longitudinal movement of the sleeve 32, so that the extent of turning movement of the steering gear crank shaft is greatly increased over the extent of turning movement of the steering rod; just as the extent of turning movement of the steering gear crank shaft shown in Figs. 1 to 4 is greatly increased over the extent of turning movement of the steering rod.

The parts of either form of the invention may be lubricated through ports 42.

What we claim and desire to secure by Letters Patent is:—

1. In a steering device the combination with a steering rod and a steering crank shaft, of a housing, a sleeve screwed into the housing, connection between the sleeve and the steering rod for turning the sleeve with the steering rod and permitting the sleeve to move axially along the steering rod, a crank arm extending from the crank shaft, a rocking body in connection with the crank arm, and a screw threaded element engaging said body and connected with said sleeve.

2. In a steering device the combination with a steering rod and a steering crank shaft, of a housing in which said crank shaft is mounted, a crank arm having radially slidable connection with said crank shaft, a screw threaded member connected with said crank arm, a sleeve screwed into the housing concentrically with the extended axis of the steering rod for moving said threaded member axially with respect to said steering rod, and a connection between the steering rod and said sleeve for turning said sleeve with the steering rod and permitting said sleeve to move axially when it is turned.

3. In a steering device, the combination with a steering rod and a steering crank shaft, of a housing, a sleeve screwed into the housing concentrically with the extended axis of the steering rod for longitudinal movements, connection between the sleeve and the steering rod for turning the sleeve to impart longitudinal movements thereto, a screw threaded member extending from said sleeve, and a radially slidable crank arm extending from said crank shaft and operated by said member for turning said crank shaft.

4. In a steering device, the combination with a steering rod and a steering crank shaft, of a sleeve having right hand threads thereon screwed within the housing concentrically with the extended axis of the steering rod, a member having left hand threads thereon and movable axially by the sleeve, connection between the steering rod and said sleeve for turning said sleeve and permitting said sleeve to move axially in the housing when it is turned, and a radially slidable crank arm extending from said crank shaft and operated by said member for turning said shaft.

5. In a steering device, the combination with a steering rod and a steering crank shaft, of a housing, a sleeve having right hand threads thereon screwed in the housing for longitudinal movements, means for turning said sleeve with the steering rod, a member extending from the lower end of said sleeve having left hand threads thereon, and a crank device supported by the crank shaft engaging the threads on said member.

6. In a steering device, the combination with a steering rod and a steering crank shaft, of a housing, a sleeve having right hand threads thereon screwed in the housing for longitudinal movements, means for turning said sleeve with the steering rod, a member extending from the lower end of said sleeve having left hand threads thereon, a crank device supported by the crank shaft engaging the threads on said member, and a bearing in said housing for guiding the lower end of said member.

7. In a steering device, the combination with a steering rod and a steering crank shaft, of a housing, a sleeve having right hand threads thereon screwed within the housing, means for turning said sleeve by the steering rod to move said sleeve axially in the housing, a crank device having radially slidable connection with the crank shaft, and a connection between said crank device and said sleeve for imparting movement to said crank device of greater extent than the movement of said sleeve.

8. In a steering device, the combination with a steering rod and a steering crank shaft, of a housing supporting said shaft and enclosing a part thereof, an element supported in the housing at right angles to said shaft for turning and longitudinal movements, means for turning said element by the steering rod, means for moving said element longitudinally when it is turned, a threaded part controlled by said element, and a part having sliding connection with said crank shaft and operated by said threaded part for turning said crank shaft.

9. In a steering device, the combination with a steering rod and a steering crank shaft, of a housing, an element supported in the housing for turning and longitudinal movements, means for turning said element by the steering rod, means for moving said element longitudinally when it is turned, a threaded part controlled by said element, a part having sliding connection with said crank shaft and operated by said threaded part for turning said crank shaft, and means for preventing torsional displacement of said threaded part.

10. In a steering device, the combination with a steering rod, and a steering crank shaft, of a housing, an element mounted in the housing for turning and longitudinal movements, means for turning said element by the steering rod, means for moving said element longitudinally when it is turned, an extension from said element, left hand threads on said extension, and a crank arm operatively connected with said left hand threads and having sliding connection with said crank shaft.

11. In a steering device, the combination with a steering rod and a steering crank shaft, of a housing, an element mounted in the housing for turning and longitudinal movements, means for turning said element by the steering rod, means for moving said element longitudinally when it is turned, an extension from said element, left hand threads on said extension, a crank arm operatively connected with said left hand threads and having sliding connection with said crank shaft, and a guiding bearing in which said element is supported.

12. In a steering device, the combination with a steering rod and a steering crank shaft, of a housing, a crank in the housing in connection with the crank shaft, a sleeve in the housing, connection between said sleeve and said housing for moving said sleeve axially when said sleeve is turned, connection for turning said sleeve by said rod, and a radially slidable crank arm operated by said sleeve for turning said crank shaft.

13. In a steering device, the combination with a steering rod and a steering crank shaft, of a housing, a crank in the housing shaft, in connection with the crank shaft, a sleeve in the housing, connection between said sleeve and said housing for moving said sleeve axially when said sleeve is turned, connection for turning said sleeve by said rod, a threaded part operated by said sleeve, and a radially slidable crank arm operated by said threaded part for turning said crank shaft.

14. In a steering device, the combination with a steering rod and a steering crank shaft, of a housing, a crank in the housing in connection with the crank shaft, a sleeve in the housing, connection between said sleeve and said housing for moving said sleeve axially when said sleeve is turned, connection for turning said sleeve by said rod, a threaded part operated by said sleeve, and a radially slidable crank arm operated by said threaded part for turning said crank shaft, and means for preventing dislocation of said threaded part under the torsional strains to which it is subjected.

VICTOR H. VAN SANT.
THOMAS G. VAN SANT.